(12) United States Patent
Li et al.

(10) Patent No.: US 7,743,676 B2
(45) Date of Patent: Jun. 29, 2010

(54) KEY TESTING APPARATUS

(75) Inventors: Lei Li, Shenzhen (CN); Ping Chen, Shenzhen (CN); Zhi Cheng, Shenzhen (CN); Jian-Gui Wu, Shenzhen (CN); Hong-Yan Li, Shenzhen (CN); Xue-Liang Zhai, Shenzhen (CN); Chang-Fa Sun, Shenzhen (CN); Yong-Zhi Tao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 348 days.

(21) Appl. No.: 11/945,520

(22) Filed: Nov. 27, 2007

(65) Prior Publication Data
US 2008/0184825 A1 Aug. 7, 2008

(30) Foreign Application Priority Data
Feb. 2, 2007 (CN) .................... 2007 1 0073196

(51) Int. Cl.
*G01N 19/00* (2006.01)
*G01M 19/00* (2006.01)
(52) U.S. Cl. ..................... 73/865.9; 73/865.3
(58) Field of Classification Search .............. 73/865.9, 73/865.3, 432.1
See application file for complete search history.

(56) References Cited
U.S. PATENT DOCUMENTS

| 5,192,152 | A * | 3/1993 | Silvestri et al. | 400/679 |
| 6,304,830 | B1 * | 10/2001 | Lee | 702/114 |
| 6,314,825 | B1 * | 11/2001 | Fan | 73/865.3 |

* cited by examiner

*Primary Examiner*—Hezron Williams
*Assistant Examiner*—Tamiko D Bellamy
(74) *Attorney, Agent, or Firm*—Jeffrey T. Knapp

(57) ABSTRACT

A key testing apparatus (100) is provided. The key testing apparatus includes a base (11) and an actuator (12). The actuator includes a testing member (17) and a mounting member (18). The mounting member includes at least one base board (181) fixed to the base, a lower board (182), a mounting board (183), and a mounting sheet (185). The lower board is adjustably attached to the base board. The mounting board is adjustably attached to the lower board. The mounting sheet is adjustably attached to the mounting board. The clamping device includes a base desk (131), a clamping platform (132), at least one first clamping board (133) and second clamping board (134). The base desk is adjustably attached to the base. The clamping platform, at least one first clamping board, and at least one second clamping board are adjustably attached to the base desk.

20 Claims, 4 Drawing Sheets

KEY TESTING APPARATUS

BACKGROUND OF THE INVENTION

1. Field of the Invention

The present invention relates to key testing apparatuses, and particularly to a key testing apparatus for testing keys of a keypad of a portable electronic device.

2. Description of Related Art

A portable electronic device such as a mobile phone and a personal digital handset usually includes one or more keypads assembled therewith. The keypad includes a plurality of even arranged or distributed keys, which are generally used to input information or commands into the portable electronic device. After a long period of usage, the keypad often encounters failure/inactivation of some keys thereof. As a result of that, the keypad requires to either be repaired or replace, which inevitably increase the using cost of the user.

Thus, a keys failure test of the keypad is implemented in manufacturing the portable electronic device. A typical key testing apparatus for the key failure test is expensive and complicated to operate. Moreover, the typical key testing apparatus can test keys of a particular portable electronic device with a fixed size or shape. In other words, the present key testing apparatus cannot test keys of another portable electronic device with a different size or shape. Each particular key testing apparatus corresponds to one kind of portable electronic device with a particular size or shape. Thus, during the process of test, a plurality of key testing apparatus is inevitably implemented to test keys of various kinds of portable electronic devices. It results in cost consuming and decreases the efficiency of the whole test.

Therefore, a heretofore-unaddressed need exists in the art to address the aforementioned deficiencies and inadequacies.

SUMMARY

In one aspect, a key testing apparatus for testing a key of a portable electronic device is provided. The key testing apparatus includes a base and an actuator. The actuator includes a testing member and a mounting member. The testing member is configured for testing the key of the portable electronic device. The testing member is mounted on the mounting member. The mounting member includes at least one base board fixed to the base, a lower board, a mounting board, and a mounting sheet. The lower board is adjustably attached to the at least one base board along a first axis direction. The mounting board is adjustably attached to the lower board along a second axis direction. The mounting sheet is adjustably attached to the mounting board along a third axis direction. The clamping device includes a base desk, a clamping platform, at least one first clamping board, and at least one second clamping board. The base desk is adjustably attached to the base along the second axis direction. The clamping platform is adjustably attached to the base desk along the second axis direction. Each of the first clamping board is adjustably attached to the base desk along the third axis direction. Each of the second clamping board is adjustably attached to the base desk along the third axis direction. The first, second, and third axis direction are perpendicular to each other.

These and other aspects of the present invention will become more apparent from the following detailed description of the preferred embodiments taken in conjunction with the accompanying drawings, although variations and modifications therein may be affected without departing from the spirit and scope of the novel concepts of the disclosure.

BRIEF DESCRIPTION OF THE DRAWINGS

Many aspects of a key testing apparatus for portable electronic device can be better understood with reference to the following drawings. These drawings are not necessarily drawn to scale, the emphasis instead being placed upon clearly illustrating the principles of the present key testing apparatus for portable electronic device. Moreover, in the drawings like reference numerals designate corresponding parts throughout the several views. Wherever possible, the same reference numbers are used throughout the drawings to refer to the same or like elements of an embodiment, and wherein.

DETAILED DESCRIPTION OF THE EMBODIMENTS

The present key testing apparatus for a portable electronic device is described here in conjunction with the accompanying drawings in FIGS. 1-4. The key testing apparatus is suitable in testing keys of the portable electronic device, such as the mobile phone, the personal digital handset, or the like, during a process of key failure testing.

Figure 1:
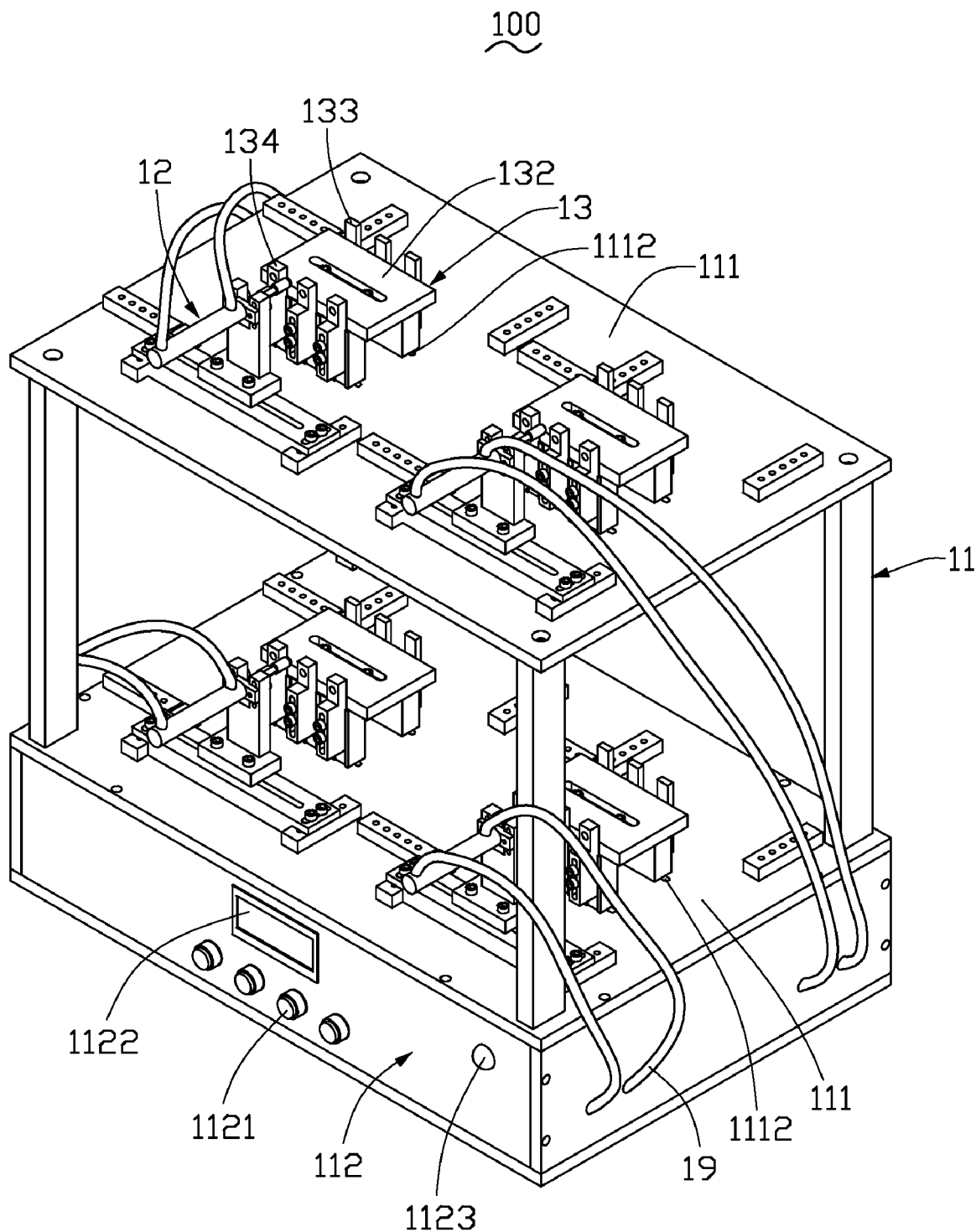
FIG. 1 is an isometric view of a key testing apparatus in accordance with a present embodiment.

Referring now to FIG. 1, the key testing apparatus 100 includes a base 11, a controller (not shown), a power generator (not shown), an actuator 12, a clamping device 13 and two pipes 19. The controller, the actuator 12, the clamping device 13 and the pipe 14 are mounted to the base 11. The controller is coupled/connected electronically to the power generator. The actuator 12 connects to the power generator via two pipes 19.

Figure 2:
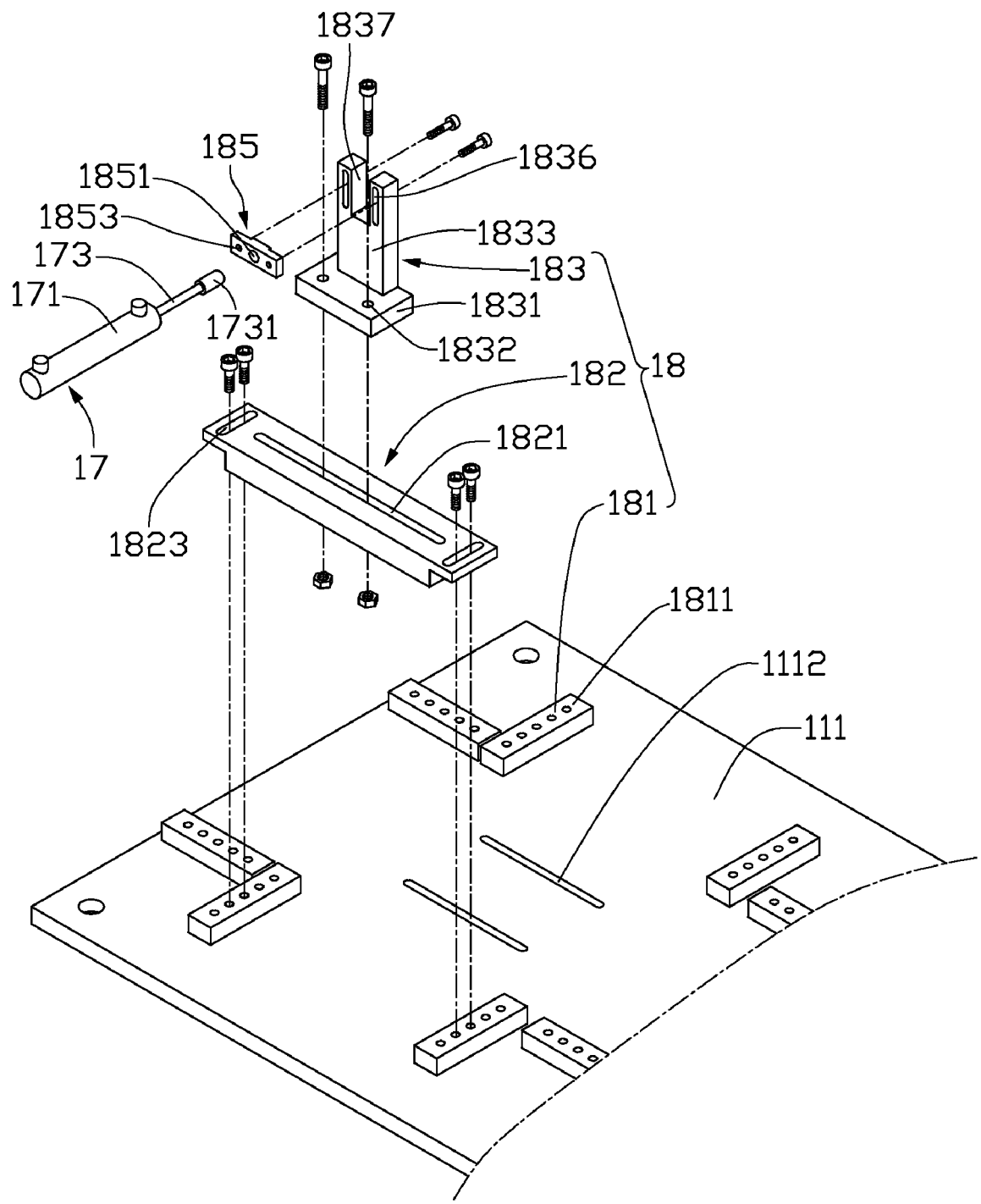
FIG. 2 is an exploded, isometric view of an actuator of the key testing apparatus shown in FIG. 1.

Referring further to FIG. 2, the base 11 includes a working platform 111 and a controlling panel 112. The working platform 111 is substantially planar which allow the actuator 12 and the clamping device 13 to be stably mounted thereon. The working platform 111 has two first through slots 1112 defined therethrough. The clamping device 13 is mounted on the two first through slots 1112. The two first through slots 1112 are arranged/distributed parallel to each other.

The controlling panel 112 serves as a medium for facilitating interactive actions between user and the key testing apparatus 100. The controlling panel 112 includes a plurality of keys/buttons 1121 and a LCD display 1122. The plurality of keys/buttons 1121 is used to input commands to set total number of pressing the keys 101 of the portable electronic device 10, value of the force of each pressing, frequency of the pressing, and etc. LCD display 1122 can display various kinds of information concerning with the key testing apparatus 100 and testing process thereof, such as the above inputted commands, the testing result, or the like.

The controller can be MCU (Micro Controller Unit), PLC (Programmable Logic Controller) or other control device that can perform functions of receiving controlling command sent from the user and outputting signals thus controlling the power generator and the actuator 12. The power generator is air supplied thus; the connected pipes 19 are air pipes for carrying and transporting the air from the power generator to actuator 12.

The actuator 12 includes a testing member 17 and a mounting member 18. The testing member 17 includes a cylinder 171 and a piston 173. The piston 173 is partially received in the cylinder 171 with a head 1731 protruding outside. The piston 173 divides the cylinder 171 into two separate rooms. The two separate rooms of the cylinder 171 respectively connect the power generator by one respective pipe 19. By means of altering relative pressure intensity between the two rooms, the piston 173 can slide with a successive reciprocating motion relative to the cylinder 171. The head 1731 is advantageously soft, or coiled with a soft member such as rubber and etc. In testing, the head 1731 presses against the key 101 of the portable electronic device 10 and return adversely in one reciprocating motion of the piston 173. The soft feature of the head 1731 is to prevent the keys 101 from being damaged quickly by the head 1731.

The mounting member 18 of the actuator 12 includes two base boards 181, a lower board 182, a mounting board 183, and a mounting sheet 185. The mounting member 18 combined with the testing member 17 is mounted on the working platform 111 of the key testing apparatus 100.

Each base board 181 is rectangular-shaped and has a plurality of first screw holes 1811 defined therein. The first screw holes 1811 are arranged in a line with the same distance between each other. The two base boards 181 are disposed/mounted/formed on the working platform 111 of the key testing apparatus 100 and are further located on a same side of the first through slot 1112 of the working platform 111. The distance between the two base boards 181 depends on a length of the lower board 182 of the mounting member 18. In other words, the distance therebetween is configured for enabling the lower board 182 to be mounted on the two base boards 181.

The lower board 182 is cross-sectioned with a generally T shape. The lower board 182 has a second through slot 1821 and two third through slots 1823 defined therethrough. The third through slots 1823 are respectively defined at two ends of the lower board 182. Each third through slot 1823 corresponds to at least two adjacent first screw holes 1811 of each base board 181. The third through slots 1823, the first screw holes 1811 and four screws (not labeled) facilitate the attachment of the lower board 182 to the base boards 181.

The mounting board 183 includes a base portion 1831 and a supporting portion 1833. The base portion 1831 is generally rectangular-shaped and has two second screw holes 1832 defined therethrough. The second screw holes 1832 correspond to the second through slot 1821 of the base board 181. The second through slot 1821, the second screw holes 1832 and two screws (not labeled) facilitate the attachment of the mounting board 183 to the lower board 182. The supporting portion 1833 is generally rectangular-shaped with a rectangular cut 1837 defined through an upper end thereof. The supporting portion 1833 is disposed on a surface of the base portion 1831. The two second screw holes 1832 are positioned on a same side of the supporting portion 1833. The supporting portion 1833 has two fourth through slots 1836 defined therethrough. The fourth through slots 1836 are respectively located at two sides of the cut 1837.

The mounting sheet 185 is generally rectangular-shaped and has a through hole 1851 and two third screw holes 1853 defined therethrough. The through hole 1851 is disposed between the two third screw holes 1853. The through hole 1851 is configured to accommodate the piston 173 of the actuator 12 allowing the piston 173 to slide freely and stably along the through hole 1851. The two third screw holes 1853 respectively correspond to the two fourth through slots 1836 of the mounting board 183. The fourth through slots 1836, the third screw holes 1853 and two screws (not labeled) facilitate the attachment of the mounting sheet 185 to the mounting board 183.

Figure 3:
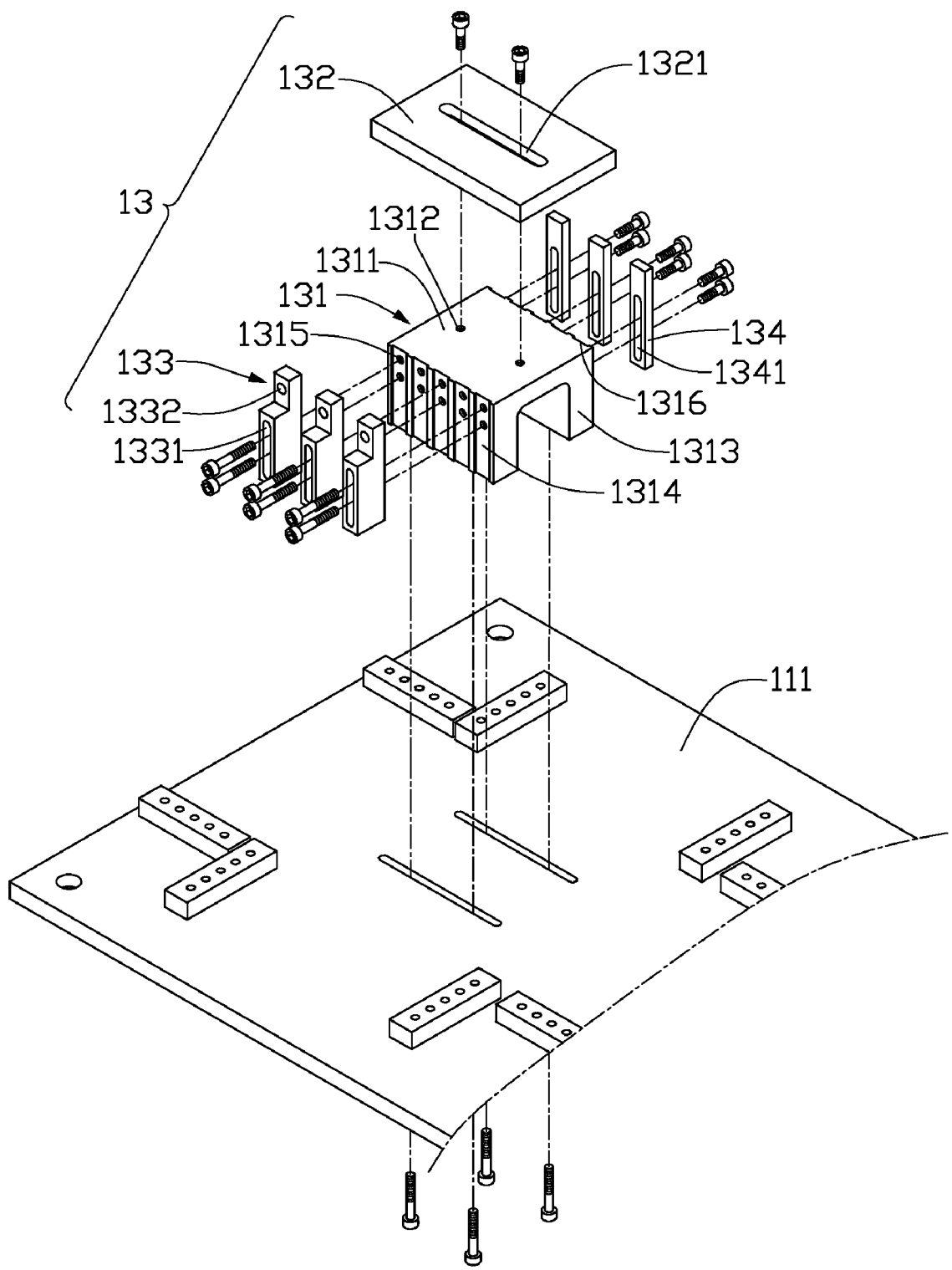
FIG. 3 is an exploded, isometric view of a clamping device of the key testing apparatus shown in FIG. 1.

Referring further to FIG. 3, the clamping device 13 includes a base desk 131, a carrying platform 132, a plurality of first clamping boards 133, a plurality of second clamping boards 134, and a plurality of universal screws (not shown). The portable electronic device 10 is placed on the carrying platform 132 and is then clamped via the engagement of the first and second clamping boards 133 and 134 and the universal screws.

The base desk 131 of the clamping device 13 is generally U-shaped and includes an upper portion 1311 and two foot portions 1313. The two foot portions 1313 are vertically disposed on the two sides of the upper portion 1311. The upper portion 1311 has two fourth screw holes 1312 defined therein. An exterior sidewall of one foot portion 1313 has a plurality of first sliding grooves 1314 and fifth screw holes 1315 defined therein. An exterior sidewall of the other foot portion 1313 has a plurality of second sliding grooves 1316 and sixth screw holes (not shown) defined therein. The two foot portions 1313 both have two seventh screw holes (not shown) defined in a bottom wall thereof. The first sliding grooves 1314 are arranged in parallel and proximate to each other. Each two fifth screw holes 1315 are located in one respective first sliding groove 1314. The second sliding grooves 1316 are arranged opposite to the first sliding grooves 1314 of the two foot portions 1313. The second sliding grooves 1316 are arranged in parallel and proximate to each other. Each of the two fifth and sixth screw holes 1315 are located in each first and second sliding groove 1314 and 1316. The seventh screw holes correspond to the two first through slots 1112 of the working platform 111. The seventh screw holes, the first through slots 1112, and four screws cooperatively fix the base desk 131 on the working platform 111.

The carrying platform 132 of the clamping device 13 is generally a rectangular plate, which is used to carry the portable electronic device 10. The carrying platform 132 has a fifth through slot 1321 defined therethrough. The fifth through slot 1321 corresponds to the fourth screw holes 1312 of the base desk 131. The fifth through slot 1321, the fourth screw holes 1312 and two screws (not labeled) facilitate the attachment of the carrying platform 132 to the base desk 131.

Each first clamping board 133 of the clamping device 13 is generally a deformed rod and has a universal screw hole 1332 and a sixth through slot 1331 defined therethrough. The first clamping board 133 is configured to engage with the first sliding groove 1314. The sixth through slot 1331 corresponds to the fifth screw holes 1315 of the base desk 131. The sixth through slot 1331, the fifth screw holes 1315 and two screws (not labeled) facilitate the attachment of the first clamping board 133 to the base desk 131.

Each second clamping board 134 of the clamping device 13 is generally a rod and has a seventh through slot 1341 defined therethrough. The seventh through slot 1341 corresponds to the sixth screw holes of the base desk 131. The seventh through slot 1341, the sixth screw holes and two screws (not labeled) facilitate the attachment of the second clamping board 134 to the base desk 131.

Each universal screw of the clamping device 13 is configured to engage with the universal screw hole 1332 of the first clamping board 133 and adjusted to stably clamp the portable electronic device 10 according to the shape and size of the portable electronic device 10.

Figure 4:
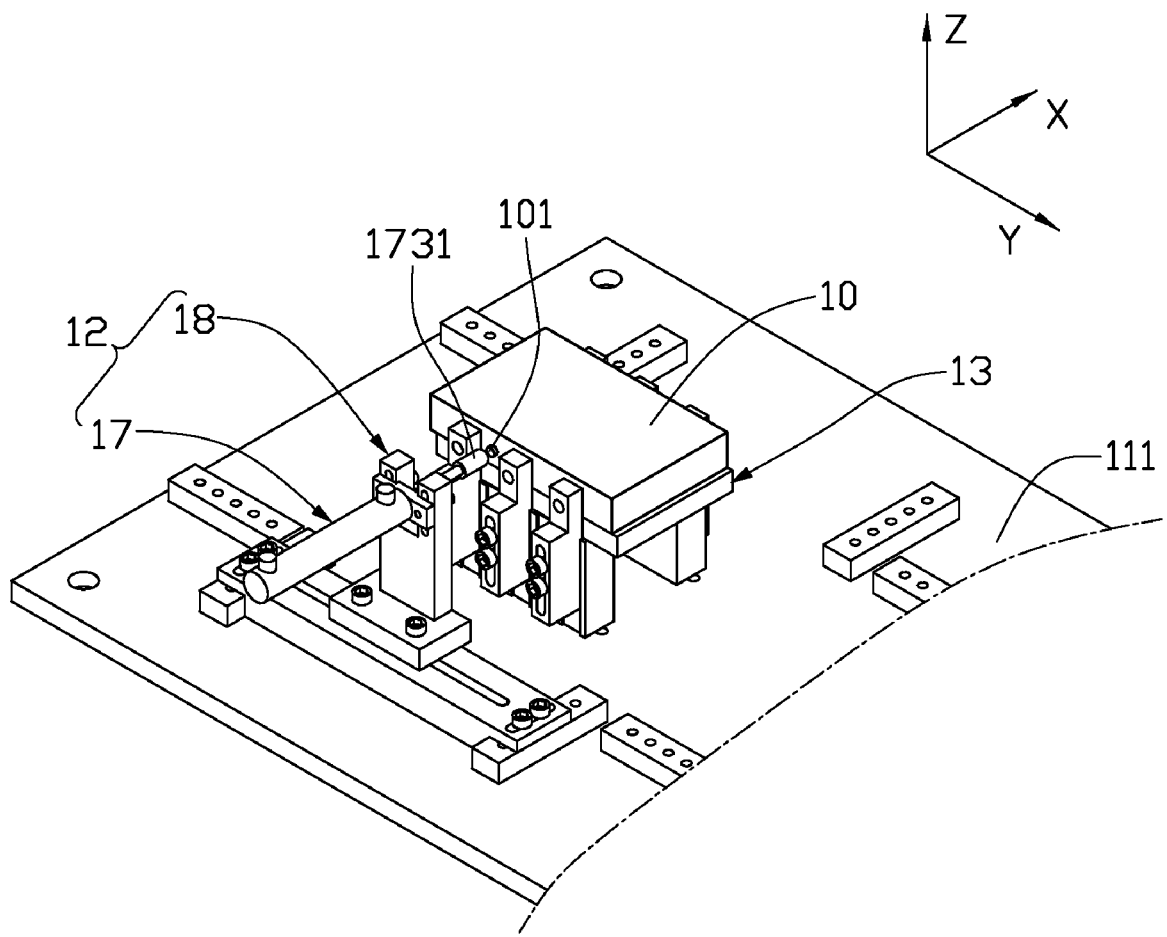
FIG. 4 is an isometric, assembled view of the key testing apparatus shown in FIG. 1.

Referring to FIG. 4, the actuator 12 and the clamping device 13 are assembled and secured with the working platform 111. The portable electronic device 10 is carried by the carrying platform 132 of the clamping device 13 and then clamped/hold by a combination of the first and second clamping boards 133 and 134 and the universal screws. The key 101 of the portable electronic device 10 is placed in alignment with the head 1731 of the piston 173 of the actuator 12. During testing stage, power generator receives command signals from the controller, and then drives the reciprocating movement of the piston 173 of the actuator 12. As such, the head 1731 of the piston 173 impacts the key 101 of the portable electronic device 10 in a reciprocating manner. Thus, the key 101 of the portable electronic device 10 is tested by the head 1731 of the piston 173.

The actuator 12 of the key testing apparatus 100 can be adjusted in three-dimensional direction. More specifically, due to the attachment position of each third through slot 1823 of the lower board 182 to each two first screw holes 1811 of the base board 181 being varied, the lower board 182 can be fixed to the base boards 181 in a variety of positions. The position of the lower board 182 relative to the base boards 181 can be adjusted in an X-axis direction. The mounting board 183 can be secured to the lower board 182 in a variety of positions. The second screw holes 1832 of the mounting board 183 can be attached to varied positions of the second through slot 1821 of the lower board 182 via the two screws. The position of the mounting board 183 relative to the lower board 182 can be adjusted in a Y-axis direction. The fixed position of the mounting sheet 185 can be adjusted in a Z-axis direction. The Z-axis direction is substantially oriented to be perpendicular to a plane cooperatively formed by the X-axis and Y-axis direction. The mounting sheet 185 can be fixed to the supporting portion 1833 of the mounting board 183 in variety of positions.

The clamping device 13 of the key testing apparatus 100 can be adjusted in two-dimensional direction. More specifically, due to the screw can fix each first clamping board 133 of the clamping device 13 to the respective first sliding groove 1314 of the base desk 131 of the clamping device 13 in a variety of positions, the first clamping board 133 can be adjusted in Z-axis direction with respect to the base desk 131. The attached position of the carrying platform 132 relative to the base desk 131 can be adjusted via adjusting the position of the fourth screw holes 1312 of the base desk 131 relative to the fifth through slot 1321 of the carrying platform 132. The base desk 131 can also be positioned along the Y-axis direction by changing the position of the seventh screw holes of the base desk 131 relative to the first through slot 1112 of the working platform 111.

Thus, the key testing apparatus 100 can be adjusted in three-dimensional direction, which can clamp and test the portable electronic device 10 with different size and shape. It is unnecessary to implement another particular key testing apparatus 100 to a particular portable electronic device 10 with a particular size or shape. This saves costs of time and money, and increases the efficiency of the whole test.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A key testing apparatus, comprising:
 a base;
 an actuator, comprising:
  a testing member; and
  a mounting member, the testing member mounted on the mounting member, the mounting member comprising:
  at least one base board mounted on the base;
  a lower board attached to the at least one base board where position of the lower board relative to the at least one base board is configured to be adjustable along a first axis direction;
  a mounting board attached to the lower board where position of the mounting board relative to the lower board is configured to be adjustable along a second axis direction; and
  a mounting sheet attached to the mounting board where position of the mounting sheet relative to the mounting board is configured to be adjustable along a third axis direction; and
 a clamping device, comprising:
  a base desk attached to the base where position of the base desk relative to the base is configured to be adjustable along the second axis direction;
  a clamping platform attached to the base desk where position of the clamping platform relative to the base desk is configured to be adjustable along the second axis direction;
  at least one first clamping board attached to the base desk where position of the first clamping board relative to the base desk is configured to be adjustable along the third axis direction;
  at least one second clamping board attached to the base desk where position of the second clamping board relative to the base desk is configured to be adjustable along the third axis direction;
 wherein the first, second, and third axis direction are perpendicular to each other.

2. The key testing apparatus as claimed in claim 1, wherein each base board has at least two screw holes defined therein, the lower board has at least one through slot defined therethrough, and each through slot and each two screw holes are configured to help attach the lower board to the at least one base board.

3. The key testing apparatus as claimed in claim 1, wherein the mounting board comprises a base portion and a base portion, the base portion is substantially vertically disposed on the base portion, the base portion is configured to attach to the lower board, and the upper portion is configured to attach to the mounting sheet.

4. The key testing apparatus as claimed in claim 3, wherein the lower board has a through slot defined therethrough, the base portion has at least one screw hole defined therethrough, and the through slot and the at least one screw hole are configured to help attach the base portion to the lower board.

5. The key testing apparatus as claimed in claim 3, wherein the mounting sheet has at least one screw hole defined therethrough, the supporting portion has at least one through slot defined therethrough, and the at least one through slot and the at least one screw hole are configured to help attach the mounting sheet to the supporting portion.

6. The key testing apparatus as claimed in claim 5, wherein the mounting sheet further has a through hole defined therethrough, the supporting portion has a cut defined therethrough, the through hole is configured to align with the cut when the mounting sheet is attached to the supporting portion.

7. The key testing apparatus as claimed in claim 1, wherein the base desk includes an upper portion, the upper portion has at least one screw holes defined therein, the clamping platform has a through slot defined therethrough, and the through slot and the at least one screw hole are configured to help attach the clamping platform to the upper portion.

8. The key testing apparatus as claimed in claim 1, wherein the base comprises a working platform, the working platform has two through slots defined therethrough, the base desk includes two foot portions, each foot portion has at least one screw hole defined therein, and each through slot and each screw hole are configured to help attach the base desk to the working platform.

9. The key testing apparatus as claimed in claim 1, wherein the base desk comprises an upper portion and two foot portions, and the two foot portions are respectively disposed on two sides of the upper portion.

10. The key testing apparatus as claimed in claim 9, wherein the at least one first clamping board is attached to an exterior sidewall of one foot portion, and the at least one second clamping board is attached to an exterior sidewall of the other foot portion.

11. The key testing apparatus as claimed in claim 10, wherein each exterior surface has at least one sliding grove and at least one screw hole defined therein, the first and second clamping board both have a through hole defined therethrough, the at least one sliding groove, the at least one screw hole, and the through holes are configured to help each first and second clamping board attach to the foot portions.

12. The key testing apparatus as claimed in claim 11, wherein each first and second clamping boards further has an universal screw hole defined therethrough, the universal screw hole being configured for engaging with an universal screw.

13. The key testing apparatus as claimed in claim 1, wherein the testing member comprises a cylinder and a piston, the piston is partially received in the cylinder with a head protruding outside, and the piston is configured to slide with a successive reciprocating motion relative to the cylinder.

14. The key testing apparatus as claimed in claim 13, wherein the head is coiled with a soft member.

15. A key testing apparatus for testing a key of a portable electronic device, comprising:
 a base,
  an actuator, comprising:
   a testing member configured for testing a key of a portable electronic device; and
   a mounting member, the testing member mounted on the mounting member, the mounting member comprising:
    at least one base board fixed to the base;
    a lower board adjustably attached to the at least one base board along a first axis direction;
     a mounting board adjustably attached to the lower board along a second axis direction; and
     a mounting sheet adjustably attached to the mounting board along a third axis direction; and
  a clamping device, comprising:
   a base desk adjustably attached to the base along the second axis direction;
   a clamping platform adjustably attached to the base desk along the second axis direction;
   at least one first clamping board adjustably attached to the base desk along the third axis direction;
   at least one second clamping board adjustably attached to the base desk along the third axis direction;
  wherein the first, second, and third axis direction are perpendicular to each other.

16. The key testing apparatus as claimed in claim 15, wherein each base board has at least two screw holes defined therein, the lower board has at least one through slot defined therethrough, and each through slot and each two screw holes are configured to help attach the lower board to the at least one base board.

17. The key testing apparatus as claimed in claim 15, wherein the mounting board comprises a base portion and a base portion, the base portion is substantially vertically disposed on the base portion, the base portion is configured to attach to the lower board, and the upper portion is configured to attach to the mounting sheet.

18. The key testing apparatus as claimed in claim 17, wherein the lower board has a through slot defined therethrough, the base portion has at least one screw hole defined therethrough, and the through slot and the at least one screw hole are configured to help attach the base portion to the lower board.

19. The key testing apparatus as claimed in claim 17, wherein the mounting sheet has at least one screw hole defined therethrough, the supporting portion has at least one through slot defined therethrough, and the at least one through slot and the at least one screw hole are configured to help attach the mounting sheet to the supporting portion.

20. The key testing apparatus as claimed in claim 15, wherein the base desk includes an upper portion, the upper portion has at least one screw holes defined therein, the clamping platform has a through slot defined therethrough, and the through slot and the at least one screw hole are configured to help attach the clamping platform to the upper portion.

* * * * *